United States Patent [19]

Hornung et al.

[11] Patent Number: 5,099,184
[45] Date of Patent: Mar. 24, 1992

[54] ELECTRICAL SERIES MOTOR WITH DYNAMIC BRAKING CIRCUIT

[75] Inventors: Friedrich Hornung, Stuttgart; Arnim Fiebig, Leinfelden-Echterdingen; Manfred Kirn; Günter Schaal, both of Stuttgart, all of Fed. Rep. of Germany

[73] Assignee: Robert Bosch GmbH, Stuttgart, Fed. Rep. of Germany

[21] Appl. No.: 434,085

[22] Filed: Nov. 9, 1989

[30] Foreign Application Priority Data

Nov. 9, 1988 [DE] Fed. Rep. of Germany ....... 3837943

[51] Int. Cl.⁵ .................................................. H02P 3/12
[52] U.S. Cl. ...................................... 318/375; 318/258
[58] Field of Search .................. 318/246, 248–252, 318/258, 375–379, 379–381, 269, 273, 54–56, 65, 86–87

[56] References Cited

U.S. PATENT DOCUMENTS

| | | | |
|---|---|---|---|
| 3,899,041 | 8/1975 | Mager | 318/382 X |
| 3,983,465 | 9/1976 | Tsuboi et al. | 318/376 |
| 4,087,727 | 5/1978 | Horiuchi et al. | 318/376 |
| 4,096,423 | 6/1978 | Bailey et al. | 318/376 X |
| 4,352,049 | 9/1982 | Franz, Jr. | 318/376 X |
| 4,471,277 | 9/1984 | Franz, Jr. | 318/376 |
| 4,812,728 | 3/1989 | Yang | 318/759 X |

FOREIGN PATENT DOCUMENTS

| | | |
|---|---|---|
| 169981 | 12/1951 | Austria . |
| 210967 | 9/1960 | Austria . |
| 1114574 | 10/1961 | Fed. Rep. of Germany . |
| 2624236 | 12/1977 | Fed. Rep. of Germany . |

Primary Examiner—William M. Shoop, Jr.
Assistant Examiner—David Martin
Attorney, Agent, or Firm—Frishauf, Holtz, Goodman & Woodward

[57] ABSTRACT

To provide sufficient magnetization to the field of a series motor when the series motor is to be operated in dynamic braking mode, with a dissipating resistor or short circuit element (4) connected across the armature (5), a circuit connection is established between one of the main terminals of the motor through the series field to supply a minimum magnetization current, at least when the motor operates under dynamic braking conditions, typically a few to up to 15% of no-load current of the motor. This is sufficient magnetization so that, even in larger motors where remanent magnetism of the field structure is insufficient, reliable dynamic braking can be ensured. A switch (S; $S_1$, $S_2$) selectively connects the motor armature for motor drive or running operation and dynamic braking operation. The magnetization current supply can be through a capacitor, resistor, or resistor-capacitor combination, which can be permanently connected across the power supply (10, 11) of the motor, or connected in circuit only when the switch (S, $S_2$) changes the motor into dynamic braking operation.

16 Claims, 1 Drawing Sheet

ELECTRICAL SERIES MOTOR WITH DYNAMIC BRAKING CIRCUIT

REFERENCE TO RELATED PUBLICATION

German Patent Disclosure Document DE-OS 30 35 185

The present invention relates to dynamoelectric machines in form of electric motors equipped with a dynamic braking circuit arrangement, to stop the machine by operating the machine as a generator and dissipate kinetic energy in a resistor; and more particularly to such an arrangement to provide for rapid stopping of a series motor adapted to drive, for example, potentially hazardous apparatus such as shears, rotating knives and the like.

BACKGROUND

Series motors, and especially universal motors, suitable for selective connection to a-c and d-c power networks, are frequently used to form the mechanical energy sources for operator-handled appliances. Typical applications are electric hand tools, hedge shears, chain-saws, lawn-mowers, grinders, planers, or, in general, hand-operated or personally used machinery which includes a cutter. Upon disconnection of the motor from a power network, the kinetic energy of the drive causes the motor to continue to rotate and, hence, cutter blades and the like also continue to operate. The continuously operating cutter blades, shears, saw blades or chains, grinding disks or other apparatus can be a hazard to the operator. When disconnecting the tool, the motor and hence the cutter blade, must be stopped quickly. Mechanical brakes to stop the tools are not suitable, since they are expensive to make, require continuous maintenance, and are subject to malfunction unless properly serviced. Usually, circuits are coupled to the motor in which the motor, after disconnection from the supply network, is changed over to generator operation. The energy generated during generator operation is applied to a load resistor which dissipates the energy in form of heat which is radiated to ambient space.

German Patent Disclosure Document DE-OS 30 35 185 describes an arrangement in which the braking or dissipating current is connected to the armature circuit of a series motor under control of a negative temperature coefficient (NTC) resistor. A braking current or dissipating current will flow through the armature network until the motor, with the tool, cutter, or other appliance connected thereto, is at least approximately stationary.

To operate a universal motor as a generator or, in other words to selectively operate a dynamoelectric machine as a motor or a generator, it is necessary that the field winding supply some magnetic field so that the machine can be self-excited. Self-excitation of the field thus must be derived from the remanence of the field structure itself. Such remanence is sometimes insufficient in order to initiate self-excitation. This is particularly so if the motors have somewhat higher power rating. Thus, reliable generator operation of the ill rotating although disconnected motor and the attached appliance or device could not be ensured.

THE INVENTION

It is an object to provide an arrangement which furnishes sufficient magnetic field excitation to a series wound dynamoelectric machine upon disconnecting the machine from motor operation to ensure that, upon continued rotation of the dynamoelectric armature, the machine will operate in a generator machine a dynamic braking mode so that it can be braked dynamically rapidly and effectively, even if the machine is of a type such that remanent magnetism may be insufficient to permit operation of the armature of the machine in a generator mode.

Briefly, a circuit element such as a capacitor, a resistor, or a capacitor-resistor combination is coupled to the energy supply of the motor dynamoelectric machine to supply a magnetizing current to at least part of the field winding, even if the armature is disconnected from the supply source.

The circuit arrangement has the advantage that, after switch-over from motor to generator mode of operation, the self-magnetization of the field is reliably started by a minimum magnetization supplied from the power supply. In accordance with a feature of the invention, only a portion of the field winding has the permanently supplied current connected thereto. This arrangement is particularly simple and permits an inexpensive switching connection.

If the dynamoelectric machine which, for short, can be referred to by its primary use, that is, a motor, is particularly adapted for alternating current (a-c) use, the magnetization current can be supplied by a capacitor. This also reduces losses. The braking current can be limited by a resistor, which can be of inexpensively manufacture, or by a low resistance value resistor which can approach the resistance value of zero, thus being replaced by a short circuit. The current to the field coils which supplies continuous magnetization should be limited, for example to a comparatively small percentage of the no-load or idling current. The capacitor or a resistor or capacitor-resistor circuit which supplies the field coil can then be suitably dimensioned for such a low holding current.

The circuit can also be used for braking of motors having computating poles. This permits operating the motor with high current values in which the armature is connected in a neutral position so that commutation, under generator operation, is efficient and does not result in brush arcing.

DRAWINGS

DETAILED DESCRIPTION

Figure 1:
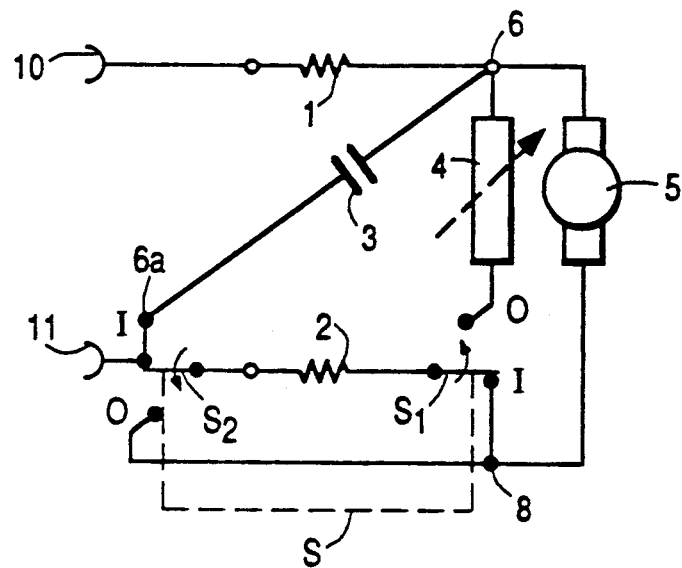
FIG. 1 is a schematic circuit diagram of a series motor connected to an a-c power supply, and incorporating the present invention.

Referring first to FIG. 1: A dynamoelectric machine in form of a series motor, adapted to be connected to an a-c power supply has field windings 1, 2, between which an armature 5 is serially connected. The free ends of the field windings 1, 2 are connected to terminals 10, 11 of a power supply. A resistor 4 can be connected in parallel with the armature 5. The resistor 4, if desired, can be a variable resistor, as schematically indicated, although this is not necessary.

A double-pole double-throw switch S, having switching units $S_1$ and $S_2$, is connected in circuit with the field winding 2. The second terminal unit $S_2$ of the switch S switches the second or free end of the field winding 2 in dependence on the position of the switch S either to the terminal 11 of the current supply network or to a junction 8. The junction or terminal 8 forms one of the end connections of the armature 5. The power supply connection is connected to a junction 6a which is connected to a terminal of a capacitor 3, the other terminal of which is connected to a junction 6 which connects the other terminal of the armature 5 to the field winding 1. The switching units $S_1$ and $S_2$ of the switch S are operated in unison, so that the switch is a double-pole double-throw (DPDT) switch. In the position I, which is normal or motor operation, the field winding 2 is connected with the terminal 11 of the voltage supply network, and through the field winding 2, the switch unit $S_1$, and through the junction 8 with the armature 5. Upon switch-over of the switch S to the zero (0) position, for generator operation, the field winding 2 is connected via the switch unit $S_1$ in series with the resistor 4. The second terminal of the field winding 2 is connected over the switch unit $S_2$ to the junction 8 and hence to the armature 5. By switch-over of the switch S, the field winding is reversely polarized. The resistor 4 can be replaced by a short circuit connection, that is, have a resistance value of, effectively, zero.

OPERATION

Motor drive mode

Upon setting switch S in the position I, the motor operates in motor drive mode. In addition to the armature current, a current will flow over the capacitor 3, the level or value of which will depend on the dimensioning of the capacitor 3 and the field winding 1.

The capacitor 3, in addition to providing the current to the field winding 1, has a further function: Since it is connected in parallel to the armature, and to a portion of the overall field winding, it is a damping or filter capacitor for sparking which may occur at the brushes due to commutation. The current flowing over the capacitor 3 will, for all practical purposes, not lead to any substantial heating of the field winding 1, since it is very low. In motor mode of operation, the resistor 4 is disconnected, so that, in the position of the switch S at I, it has no influence on motor operation.

Dynamic braking mode

Upon switch-over of the DPDT switch from motor operation to generator operation, that is, in the braking mode for the armature 5, field winding 2 will have the braking current of the armature flow therethrough. Additionally, the braking current of the armature flows through the resistor 4. This braking current excites the field 2. The continuous current supplied by the capacitor 3 to the field winding 1 ensures sufficient self-excitation and, hence, sufficient minimum magnetic field so that the voltage will build up across the armature to generate the current to flow in the field winding 2 and rapidly build up generator current. In small motors, the remanence of the stator magnetic structure is usually sufficient for self-excitation of the motor. In larger motors, however, the energy available from the magnetic remanence is insufficient to build up current flow through the armature. In accordance with the present invention, and to initiate excitation in self-excited generator operation, the additional continuous current is supplied via the capacitor 3 to the field winding 1. The level or value of the continuous current may be small with respect to the idle or no-load current of the motor. Experiments have shown that a few percent up to a maximum of about 15% of idle or no-load current is sufficient for the minimum magnetization current for the field winding 1. The continuous or magnetization current can thus be supplied by a low-loss capacitor. It has also been found that, with split field motors, as illustrated in FIG. 1, it is entirely sufficient to supply the continuous current only over one of the field windings of the split field. The level of the braking current which flows through the field winding 2 in the armature circuit is determined, essentially, by the resistance value of the resistor 4.

The DPDT switch 2 can also be used for single-pole disconnection of the motor and, hence, of any tool coupled thereto. If two-pole disconnection of the tool is desired, a three-unit or three-switch element switch may have to be used, to ensure that the field winding 1 continuously receives current when the switch units $S_1$, $S_2$ are changed over to change the motor from motor to generator mode. Such a switch is not shown since its connection and use is well known and can be designed in accordance with well known motor supply circuits.

The circuit substantially improves the self-excitation of the magnetic field of series motors, and thus permits operation of series motors in braking mode regardless of the size of the motor. It, therefore, substantially extends the utility of dynamic braking circuits when applied to series motors.

Series motors, in dependence on their predetermined direction of rotation, may a non-symmetrical armature connection, in order to obtain optimum commutation in motor operation. To obtain optimum commutation also in generator operation, the armature connection, with respect to a neutral zone, would have to be reversed in mirror-image manner. Since it is not possible to change the armature connection, commutation becomes substantially worse when such a non-symmetrical armature connection is operated in the generator mode, since, due to impaired commutation, brush-arcing and sparking occurs which provide a substantial load and wear both on the brushes as well as on the commutator. This leads to undesirable high heating and brush wear. In order to prevent such poor commutation, larger motors have commutating poles secured thereon, which, by their connection and placement, can minimize brush-sparking and arcing. Such motors can also be braked by use of the concept of the present invention, since they permit high braking current to flow and, further, permit flow of a continuous magnetization current which does not have a negative influence on the lifetime of the motor because of its low value.

The circuit can also be used with reversible motors, since it does not have any structural elements which depend on direction of rotation of the motor.

Figure 1A:
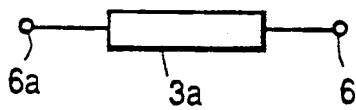
FIG. 1a is a fragmentary diagram illustrating a modification.
Figure 1B:
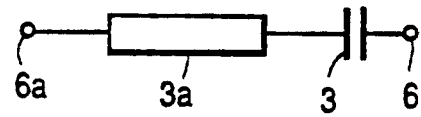
FIG. 1b is a fragmentary diagram illustrating another modification.

FIG. 1a illustrates the replacement of the capacitor 3 by a resistor 3a between the junctions 6, 6a; FIG. 1b the circuit between the terminals 6a and 6 in which a circuit using both a resistor and a capacitor is employed.

Figure 2:
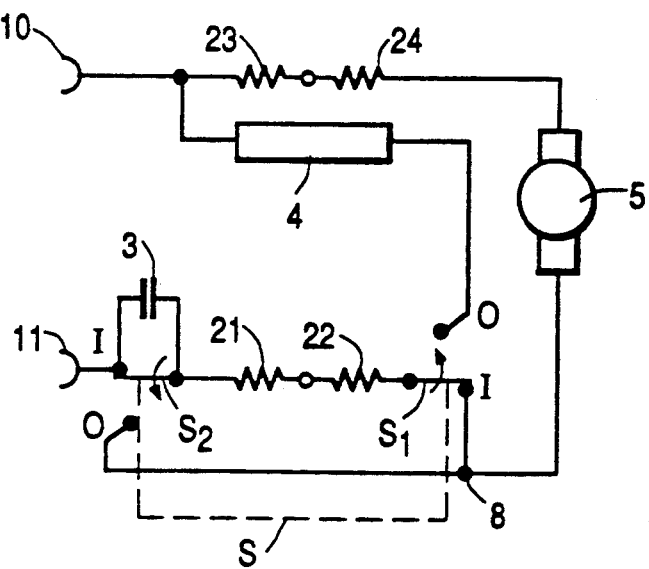
FIG. 2 is a circuit diagram illustrating another embodiment of the invention.

FIG. 2 illustrates an embodiment of the invention in which the motor is a commutating pole motor.

Referring now to FIG. 2:

Two field windings 21, 22 are serially connected to the armature 5. Additionally, the motor has commutating poles or interpoles, with windings 23, 24. The field windings 21, 22 are coupled by the switch units S₁, S₂ in position I with the supply terminal 11 to connect them to the armature 5. Upon switch-over of the switch S, the field windings 21, 22 are reversely connected with respect to the armature 5 and connected in parallel to the commutating poles 23, 24. The network supply terminal 11 remains connected via capacitor 3 with the field windings 21, 22. The resistor 4, which may be a short circuit, that is, resistance value zero, is connected in series to the field windings 21, 22. This resistor becomes effective only when the switch S is in the 0 position. The commutating pole winding 23 is connected to the power supply terminal 10 with one of its connecting ends.

Operation

Motor drive mode

The operation as a motor, with the switch S in position I, is identical to that previously described, except that current through the armature flows also through the commutating windings 23, 24, and the capacitor 3 is short-circuited by the switch unit S₂.

Dynamic braking mode

Upon switch-over of the switch S to the position 0, the field windings 21, 22 are reversely polarized with respec to the armature 5 and connected through the dissipating resistor 4 to the commutating poles 23, 24. As the switch unit S₂ changes to the position 0, current can flow through capacitor 3 from the terminal 11 to the field windings 21, 22 and through switch unit S₁ through the resistor 4 to terminal 10 of the power supply. This current triggers or starts a magnetic field in windings 21, 22 which is sufficient to cause the spinning armature to build up a voltage which results in heavy current flow through the resistor 4 and hence rapidly builds up a field from the field windings 21, 22. The resistance value of the resistor 4 is so designed that it limits the braking current to a value which can be safely accepted by the armature and by the dissipating characteristics of the resistor 4, to provide for appropriate braking of the armature 5.

Various changes and modifications may be made and any features described herein may be used with any of the others, within the scope of the inventive concept.

We claim:

1. Series dynamoelectric machine adapted for connection to an energy supply (10, 11) in combination with a dynamic braking circuit, and operable in either of
  (a) motor mode of operation;
  (b) dynamic braking mode of operation;
  said dynamoelectric machine having an armature (5);
  a main field winding (1,2; 21, 22);
  a braking current energy dissipating means (4) for dissipating braking current energy when the machine is in dynamic braking mode of operation; and
  switching means (S) connected to said armature (5) for
  (a) when the dynamoelectric machine is in motor mode of operation,
    coupling said armature to said energy supply through said main field winding in a first direction of polarization of said field winding, and
  (b) when the dynamoelectric machine is in dynamic braking mode of operation,
  coupling the armature to said dissipating means and to at least part of the main field winding in a second direction of polarization, reversed with respect to said first direction of polarization, and severing connection of the energy supply of the armature through at least a portion of the main field winding; and circuit means (3, 3a) coupled to the energy supply (10, 11) of the dynamoelectric machine and to at least part of the main field winding for supplying a magnetizing current to said at least part of the main field wining independently of current flow through said at least part of the main field winding derived from the armature when said switching means is in dynamic braking mode of operation.

2. The combination of claim 1, wherein said circuit means (3, 3a) is permanently connected to said energy supply (10, 11).

3. The combination of claim 1, wherein said main field winding has two parts, said switching means connecting one part of the main field winding in said second direction of polarization when the dynamoelectric machine is in said dynamic braking mode of operation, and the other part of said field winding being permanently connected through said circuit means (3, 3a) across said energy supply (10, 11).

4. The combination of claim 1, wherein said circuit means (3, 3a) is connected across a switching terminal (S2) of said switching means, said switching terminal, when said switch is in the position for motor mode of operation of the dynamoelectric machine, short-circuiting said circuit means and, when said switch is placed in the position of dynamic braking mode of operation of the dynamoelectric machine, serially connecting said circuit means (3, 3a) with said main field winding (21, 22) said dissipating means (4) and across said energy supply (10, 11) to provide initial magnetization current for the main field winding.

5. The combination of claim 1 wherein said circuit means (3) coupled to the energy supply for supplying said magnetization current comprises a capacitor (3).

6. The combination of claim 1, wherein said circuit means (3a) coupled to the energy supply for supplying said magnetization current comprises a resistor (3a).

7. The combination of claim 1, wherein said circuit means coupled to the energy supply for supplying said magnetization current comprises a resistor (3a) in series with a capacitor (3).

8. The combination of claim 1, wherein the impedance of said circuit means (3, 3a) for supplying the magnetization current to at least part of the main field winding is dimensioned of such value that current will flow to said at least part of the main field winding of a value of up to 15% of the no-load current of the motor.

9. The combination of claim 1, wherein said dissipating means (4) comprises a dissipating resistor (4) dimensioned to limit the armature current, under dynamic braking mode, to a predetermined current value.

10. The combination of claim 9, wherein said dissipating resistor comprises a variable resistor.

11. The combination of claim 1, wherein the main field winding (1, 2) is a split field winding having two split parts (1, 2);
  and wherein said switching means is connected to only one (2) of said split parts for selective connection to the dissipating means, the other (1) of said split parts being connected to said circuit means supplying the magnetization current.

12. The combination of claim 1, wherein said dynamoelectric machine has said main field winding (21, 22) and a commutating or interpole winding (23, 24):
   wherein said switching means (S) is connected to said main field winding (21, 22) for reversely connecting said main field winding upon switch-over of the machine into dynamic braking mode of operation; and
   said switching means (S) further connects said circuit means supplying the magnetization current to the main field windings upon switch-over into dynamic braking mode of operation.

13. The combination of claim 12, wherein the main field winding is a two-part split field winding, and said magnetization current is connected to the parts of the split field winding.

14. The combination of claim 13, wherein the commutating winding comprises a plurality of commutating winding units (23, 24) for a plurality of commutating poles.

15. The combination of claim 1, wherein the dynamoelectric machine includes commutating poles and commutating pole windings (23, 24).

16. The combination of claim 1, wherein said switching means (S) is coupled to the circuit means (3, 3a) supplying the magnetization current, for supplying said magnetization current to the at least part of the main field winding only when said switching means connects the dissipating means in a closed circuit with the armature for operation of the dynamoelectric machine in dynamic braking mode.

* * * * *